UNITED STATES PATENT OFFICE.

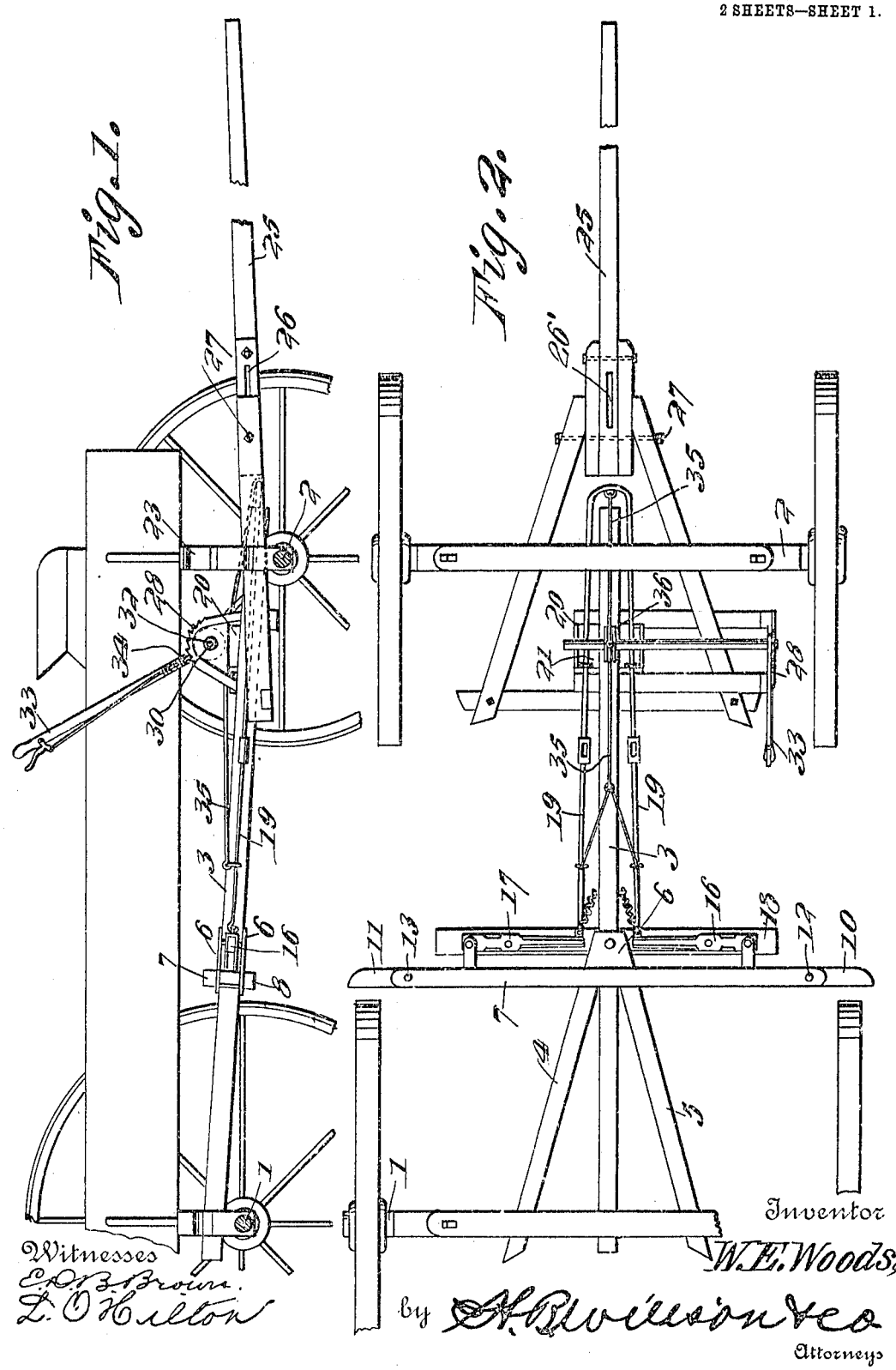

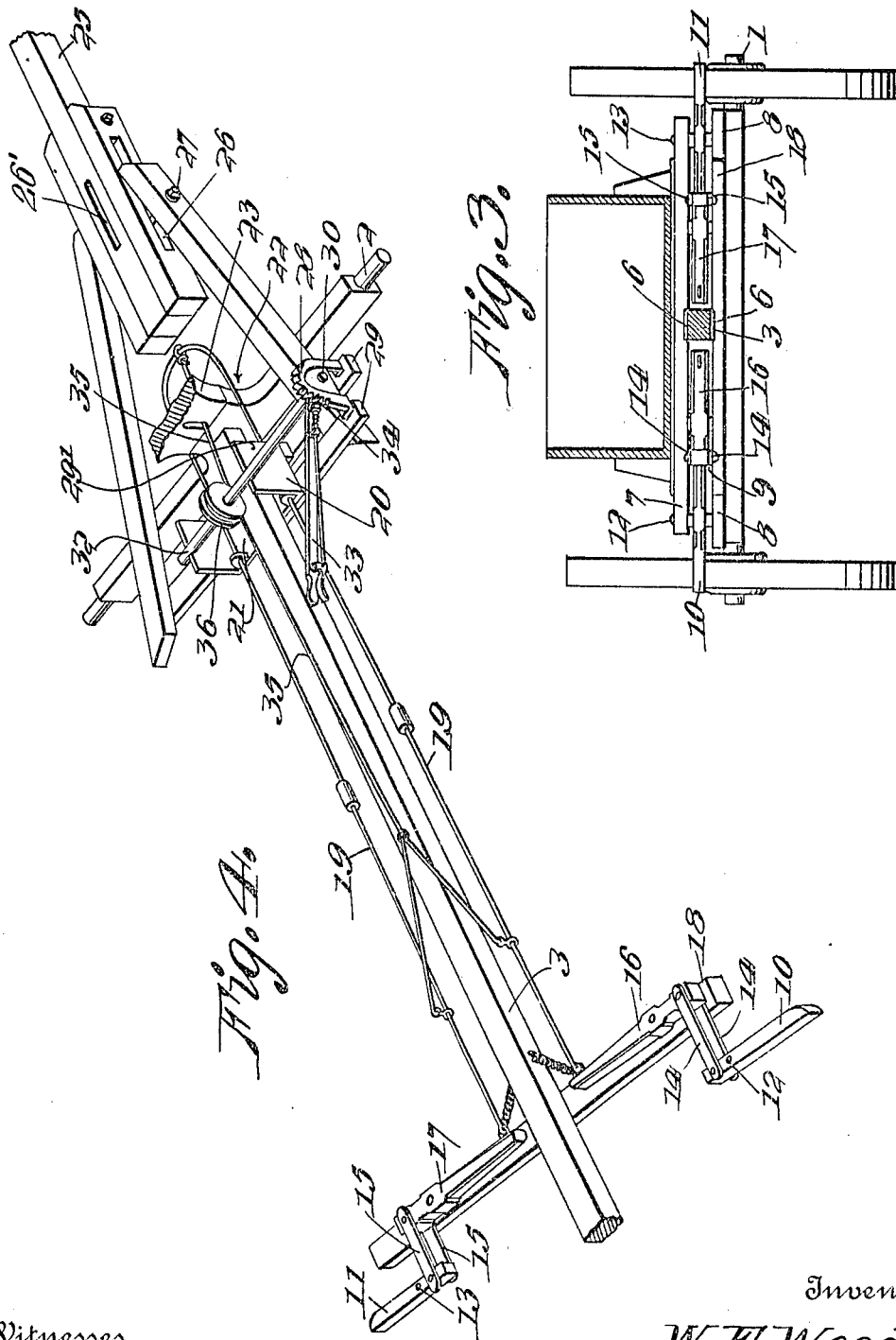

WILLIAM E. WOODS, OF GRIFFIN, INDIANA.

WAGON-BRAKE.

954,238.

Specification of Letters Patent. Patented Apr. 5, 1910.

Application filed September 16, 1909. Serial No. 518,070.

*To all whom it may concern:*

Be it known that I, WILLIAM E. WOODS, a citizen of the United States, residing at Griffin, in the county of Posey and State of Indiana, have invented certain new and useful Improvements in Wagon-Brakes; and I do declare the following to be a full, clear, and exact description of the invention, such as will enable others skilled in the art to which it appertains to make and use the same.

This invention relates to a wagon brake and is especially designed as an improvement over my wagon brake construction shown in Patent No. 913,342.

The primary object of this invention is the construction of a wagon brake arranged to be automatically applied by a backward movement of the draft animals against the wagon tongue.

A further object of the invention is to provide manually operated means for applying the brake so that the draft animals may be allowed to rest from time to time when going down a steep hill or decline.

With these and other objects in view, the invention consists of certain novel features of construction, combination and arrangement of parts as will be more fully described and particularly pointed out in the appended claims.

In the drawings, Figure 1 is a side elevation of my improved wagon brake; and Fig. 2 is a plan view thereof. Fig. 3 is a transverse section taken through the wagon in front of the rear wheels and brake shoes, looking rearwardly. Fig. 4 is a detail perspective view of the running gear of the vehicle with my improved brake applied thereto.

Referring to the drawings for a more particular description of the invention, 1 and 2 denote the rear and front axles respectively, which are of the usual type and 3 the reach bar which extends between the axles and is connected thereto in any desired manner. A plurality of braces 4 and 5, may extend forwardly from the rear axle and are connected by means of a strap or securing plate 6, to the reach bar 3. At the point where the braces 4 and 5 are connected to the reach bar 3, a plurality of bars 7 and 8 are secured on opposite sides of said reach bar against the ends of said braces so as to form spaces 9 across which the brake shoes 10 and 11 are arranged to move. Said brake shoes are pivoted by means of pins 12 and 13, at points intermediate their ends to the ends of the cross bars 7 and 8 and are connected at their inner ends to link straps 14 and 15, which extend forwardly in a horizontal plane and substantially parallel with the reach bar. The straps 14 and 15 are pivotally connected with the operating levers 16 and 17, on the outer ends of said levers and said levers are pivotally mounted between their ends on a cross bar 18, which extends across the reach bar 3 and is connected to the underside thereof. The inner ends of the levers 16 and 17 are connected to the ends of a U-shaped operating member 19, which slides through and is guided in its movement by a U-shaped bearing 20, the cross-piece or central portion 21 of which is disposed beneath the reach bar. The forward end of the operating member 19, works in a recess 22, in the front axle and between the front axle and the front bolster 23.

The tongue 25 is provided with an enlarged inner end provided with a horizontal longitudinal slot 26, through which passes a guide bolt 27. By this construction, when descending a hill or decline, the draft animals by pulling back on the tongue bring the inner end thereof against the front end of the operating member 19, which is caused to slide rearwardly and apply the brake shoes 10 and 11. The tongue is also provided with a perpendicular slot 26', so that it may be used in connection with a stiff tongued wagon wherein no provision is made for vertical swinging movement of the tongue. Under these conditions, the slot 26', receives the vertical bolt which connects the tongue with the hounds of the wagon.

I will now describe the means employed whereby the brake shoes may be applied manually so that the draft animals may be allowed to rest from time to time in descending a hill.

A segmental rack 28, is suitably supported by means of the laterally extending supporting bars 29, at one side of the vehicle and is provided with a central bearing recess 30, in which and in bearing recesses formed in the vertical pieces of the bearing 20, is mounted a transverse rock shaft 32. An operating lever is arranged at the outer end of the rock shaft and is provided with a spring actuated pawl or click 34, which is adapted to engage the notches of the rack. A cord 35, or other flexible element is attached at one end to the front end of the sliding member 19 and is then partly passed around the rock shaft 32. The cord is then wound a number of times around the pulley 36 carried by the rock shaft and is then attached at its rear end to the adjacent end of the sliding member 19. By this construction, it will be seen that when the operating lever 33, is moved forwardly, the sliding member 19 is caused to slide rearwardly through the medium of the connections described to apply the brake shoes 10 and 11 to the wheels. By moving the operating member in the opposite direction, the brake shoes are removed from the wheels. By this means, the brakes may be applied manually from time to time upon descending a hill or decline and the draft animals allowed to rest.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claims.

Having thus described my invention, what I claim is:

1. A vehicle brake comprising brake shoes, a brake-operating member mounted for longitudinal movement on the running gear, means of connection between the ends of said member and the brake shoes, whereby the latter are applied when the former is shifted rearwardly, manually-operable connections for shifting the brake-operating member rearwardly, said connections comprising a transverse rock shaft, an operating lever for the shaft, a flexible element passing around the shaft and attached at opposite ends to the front and rear portions of the brake-operating member, and means for holding the operating lever in adjusted position.

2. A vehicle brake comprising brake shoes, a brake-operating member slidably mounted on the running gear of the vehicle, means of connection between the ends of said operating member and the brake shoes, whereby the latter are applied when the former is shifted rearwardly, manually-operable connections for shifting the brake-operating member rearwardly, said connections comprising the rock shaft, an operating lever for the shaft, a flexible element passing around the shaft and attached at opposite ends to the front and rear portions of the operating member and a pawl and rack for holding the operating lever in adjusted position.

3. A vehicle brake comprising brake shoes, a brake-operating member slidably mounted on the running gear of the vehicle, means of connection between the ends of the operating member and the brake shoes, whereby the latter are applied when the former is shifted rearwardly, a tongue having its inner end slidably connected with the front hounds of the wagon and adapted to engage the front end of the brake-operating member when a backward draft is applied thereto, and automatic means for holding the brake-operating member in adjusted position, said means comprising a rock shaft, an operating lever for the shaft, flexible elements passing around the shaft and connected with the brake-operating member, and means for holding the operating lever in adjusted position.

4. A vehicle brake comprising brake shoes, an approximately U-shaped brake-operating member slidably mounted upon the running gear of the vehicle, a tongue slidably connected with the front hounds of the vehicle and adapted to engage the brake-operating member when a backward draft is applied thereto, means of connection between the ends of the brake-operating member and the brake shoes whereby the latter are applied when the former is shifted rearwardly, and automatic means controlled by the movement of the operating member for holding the latter in adjusted position.

5. A vehicle brake comprising brake shoes, a brake-operating member slidably mounted upon the running gear of the vehicle, means of connection between the rear end of said operating member and the brake shoes, whereby the latter are applied when the former is shifted rearwardly, an approximately U-shaped bearing mounted on the running gear, a rock shaft mounted upon said bearing, a pulley on the rock shaft, a flexible element passing around said pulley with its opposite ends connected with the operating member, an operating lever connected with the rock shaft and a pawl and rack for holding said lever in adjusted position.

In testimony whereof I have hereunto set my hand in presence of two subscribing witnesses.

WILLIAM E. WOODS.

Witnesses:
DAVID W. HERRAN,
CHARLES T. FULLER.